(12) United States Patent
Takahashi

(10) Patent No.: US 9,312,731 B2
(45) Date of Patent: Apr. 12, 2016

(54) ROTOR FOR ROTATING ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 270 days.

(21) Appl. No.: 14/025,994

(22) Filed: Sep. 13, 2013

(65) Prior Publication Data

US 2014/0077650 A1 Mar. 20, 2014

(30) Foreign Application Priority Data

Sep. 14, 2012 (JP) ................................. 2012-203247

(51) Int. Cl.
  *H02K 21/12* (2006.01)
  *H02K 1/27* (2006.01)
(52) U.S. Cl.
  CPC ............ *H02K 1/2706* (2013.01); *H02K 1/2766* (2013.01); *H02K 2213/03* (2013.01)
(58) Field of Classification Search
  CPC .......................... H02K 1/2766; H02K 2213/03
  USPC ............................ 310/156.55, 156.56, 156.57
  See application file for complete search history.

(56) References Cited

U.S. PATENT DOCUMENTS

| 7,851,958 B2* | 12/2010 | Cai et al. .................... 310/156.53 |
| 2009/0026867 A1* | 1/2009 | Haruno et al. ........... 310/156.21 |
| 2009/0079287 A1 | 3/2009 | Hattori et al. |
| 2013/0099617 A1* | 4/2013 | Chamberlin ............. 310/156.21 |

FOREIGN PATENT DOCUMENTS

JP 2006-311730 11/2006

\* cited by examiner

*Primary Examiner* — Hanh Nguyen
(74) *Attorney, Agent, or Firm* — Nixon & Vanderhye P.C.

(57) ABSTRACT

A rotor includes a rotor core having a plurality of pairs of magnet-receiving holes and a plurality of magnets respectively received in the magnet-receiving holes. Each pair of the magnet-receiving holes is arranged in a substantially V-shape opening radially outward and a center bridge formed between the two magnet-receiving holes of the pair. For each of the magnet-receiving holes, a protrusion is formed, at a position closer to a radially outer end than a radially inner end of the center bridge, so as to protrude from the center bridge inward of the magnet-receiving hole. Moreover, a magnetic flux barrier is formed at a radially innermost corner portion of the magnet-receiving hole and defined by a curved surface that includes three or more single-curvature surfaces having different curvatures. Among the single-curvature surfaces, the single-curvature surface which has the minimum curvature is positioned closest to the longitudinal axis of the rotor core.

5 Claims, 4 Drawing Sheets

ROTOR FOR ROTATING ELECTRIC MACHINE

CROSS-REFERENCE TO RELATED APPLICATION

This application is based on and claims priority from Japanese Patent Application No. 2012-203247, filed on Sep. 14, 2012, the content of which is hereby incorporated by reference in its entirety into this application.

BACKGROUND

1. Technical Field

The present invention relates to rotors for rotating electric machines that are used in, for example, motor vehicles as electric motors and electric generators.

2. Description of Related Art

There are known rotors for rotating electric machines that are used in, for example, motor vehicles as electric motors and electric generators. Those rotors include a rotor core and a plurality of permanent magnets. The rotor core is configured to be disposed in radial opposition to a stator of the rotating electric machine. The rotor core has a plurality of pairs of magnet-receiving holes formed therein. Each pair of the magnet-receiving holes is arranged in a substantially V-shape that opens toward the stator side. Each of the permanent magnets is received in a corresponding one of the magnet-receiving holes of the rotor core. Further, for each pair of the magnet-receiving holes, the two corresponding permanent magnets which are respectively received in the two magnet-receiving holes of the pair are arranged so as to together form one magnetic pole of the rotor core.

Japanese Unexamined Patent Application Publication No. 2006-311730 (to be simply referred to as Patent Document 1 hereinafter) discloses a rotor for a rotating electric machine. In the rotor, each of the permanent magnets is arranged in the corresponding one of the magnet-receiving holes of the rotor core so that there is formed a gap between a radially-outer side surface of the permanent magnet and a wall surface of the corresponding magnet-receiving hole. The gap has a uniform width at a central portion in a width direction of the permanent magnet. Further, the gap has a greater width at end portions in the width direction of the permanent magnet than at the central portion. Consequently, with the above arrangement of the permanent magnets in the corresponding magnet-receiving holes of the rotor core, it is possible to prevent local stress concentration from occurring in the rotor core.

However, though Patent Document 1 discloses how to reduce stress concentration on a bridge connecting the permanent magnet and a q-axis core, it fails to disclose how to reduce stress concentration on a radially innermost portion of the corresponding magnet-receiving hole. The stress concentration on the radially innermost portion of the corresponding magnet-receiving hole occurs when the rotor core has a small cross-sectional area. In particular, when the rotor is used in a motor generator which has a gear or a large-diameter shaft provided radially inside of the rotor, the maximum stress induced in the radially innermost portion of the corresponding magnet-receiving hole is almost equal to that induced in the bridge. In addition, in the rotor disclosed in Patent Document 1, there is formed, at the radially innermost portion of the corresponding magnet-receiving hole, a protrusion for positioning the permanent magnet in the corresponding magnet-receiving hole. Consequently, due to the protrusion, a maximum thermal stress is also induced in the radially innermost portion of the corresponding magnet-receiving hole.

SUMMARY

According to exemplary embodiments, a rotor for a rotating electric machine is provided which includes a rotor core and a plurality of magnets. The rotor core has a longitudinal axis and a plurality of pairs of magnet-receiving holes formed therein. Each pair of the magnet-receiving holes is arranged in a substantially V-shape that opens toward a radially outer periphery of the rotor core. Each of the magnets is received in a corresponding one of the magnet-receiving holes of the rotor core. For each pair of the magnet-receiving holes of the rotor core, the two corresponding magnets which are respectively received in the two magnet-receiving holes of the pair are arranged so as to together form one magnetic pole of the rotor. The rotor core further has, for each pair of the magnet-receiving holes, a corresponding center bridge that extends in a radial direction of the rotor core between the two magnet-receiving holes of the pair to separate them from each other. For each of the magnet-receiving holes, there are also formed a protrusion and a magnetic flux barrier in the rotor core. The protrusion protrudes from the corresponding center bridge inward of the magnet-receiving hole, so as to position the corresponding magnet received in the magnet-receiving hole. The protrusion is positioned closer to a radially outer end of the corresponding center bridge than a radially inner end of the corresponding center bridge. The magnetic flux barrier is positioned at a radially innermost corner portion of the magnet-receiving hole and defined by a curved surface that includes three or more single-curvature surfaces having different curvatures. Among the single-curvature surfaces, the single-curvature surface which has the minimum curvature is positioned closest to the longitudinal axis of the rotor core.

With the above configuration, the protrusion for positioning the corresponding magnet, which would be provided at the radially innermost corner portion of the magnet-receiving hole according to the prior art, is offset radially outward of the radial center position of the corresponding center bridge. Consequently, the influence of the protrusion on generation of centrifugal stress (i.e., stress induced by centrifugal force) in the corresponding center bridge is reduced, thereby preventing excessive stress concentration from occurring in the corresponding center bridge.

Moreover, among the single-curvature surfaces of the curved surface defining the magnetic flux barrier, it is easiest for centrifugal stress to concentrate on the single-curvature surface which has the minimum curvature. However, the single-curvature surface with the minimum curvature is located away from the corresponding center bridge. Consequently, it is possible to distribute stress concentration in the rotor core. In other words, it is possible to prevent excessive stress concentration from occurring in the rotor core.

Furthermore, with the above configuration, the protrusion, at which a maximum thermal stress may occur, is positioned away from the radially innermost corner portion of the magnet-receiving hole. Consequently, thermal stress concentration will not occur at the same areas of the rotor core as centrifugal stress concentration. As a result, it is possible to reduce the total stress concentration in the rotor core.

In one exemplary embodiment, the curved surface which defines the magnetic flux barrier includes first to third continuous single-curvature surfaces. The first single-curvature surface has a first radius of curvature and its center of curvature located radially outside of the curved surface. The second single-curvature surface has a second radius of curvature and its center of curvature located radially outside of the curved surface. The third single-curvature surface has a third radius of curvature and its center of curvature located radially outside of the curved surface. Among all the single-curvature surfaces included in the curved surface, the second single-curvature surface has the minimum curvature and is positioned closest to the longitudinal axis of the rotor core.

Further, the curved surface which defines the magnetic flux barrier also includes a fourth single-curvature surface that connects the third single-curvature surface and a radially inner-side wall surface of the magnet-receiving hole. The fourth single-curvature surface has a fourth radius of curvature and its center of curvature located radially inside of the curved surface.

In another exemplary embodiment, the curved surface which defines the magnetic flux barrier includes, on each of opposite sides of the single-curvature surface which has the minimum curvature, a plurality of continuous single-curvature surfaces having different curvatures.

It is preferable that for each of the magnet-receiving holes of the rotor core, there is formed, radially outside of the protrusion, a second magnetic flux barrier for causing a magnetic short circuit along the corresponding center bridge.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
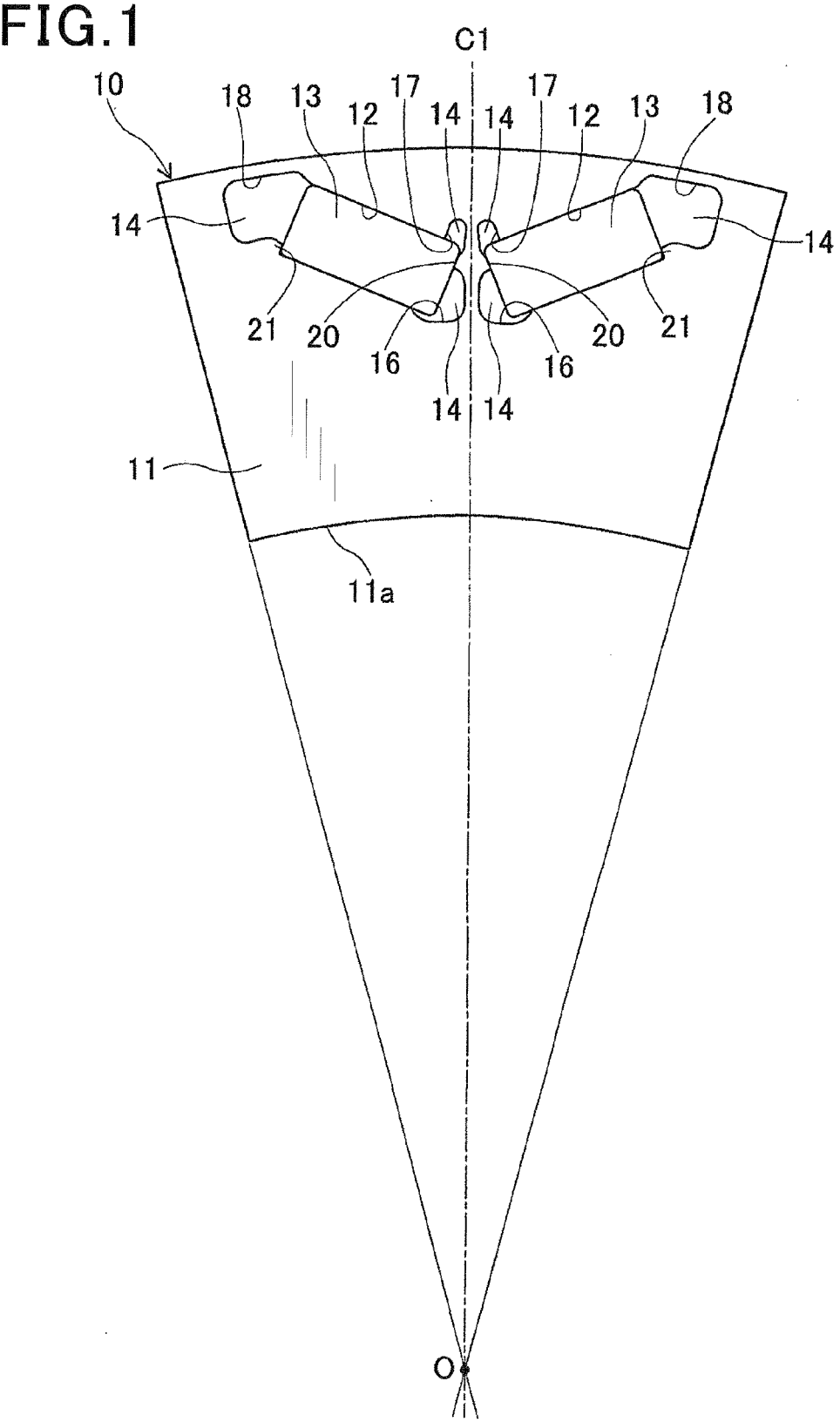
FIG. 1 is an axial view of a portion of a rotor according to a first embodiment, the portion making up one magnetic pole of the rotor.

Exemplary embodiments will be described hereinafter with reference to FIGS. 1-4. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a rotor 10 according to a first embodiment.

The rotor 10 is designed to be used in an electric motor (not shown) for a motor vehicle. The motor includes, in addition to the rotor 10, a housing, a stator and a rotating shaft, all of which are not shown in the figures. The housing is configured to receive both the rotor 10 and the stator therein such that the rotor 10 is disposed radially inside the stator. That is to say, the motor is of an inner rotor type. The rotating shaft is rotatably supported at opposite ends thereof by the housing via a pair of bearings (not shown). The rotor 10 is configured to be fixedly fitted on the rotating shaft so as to rotate along with the rotating shaft.

Figure 2:
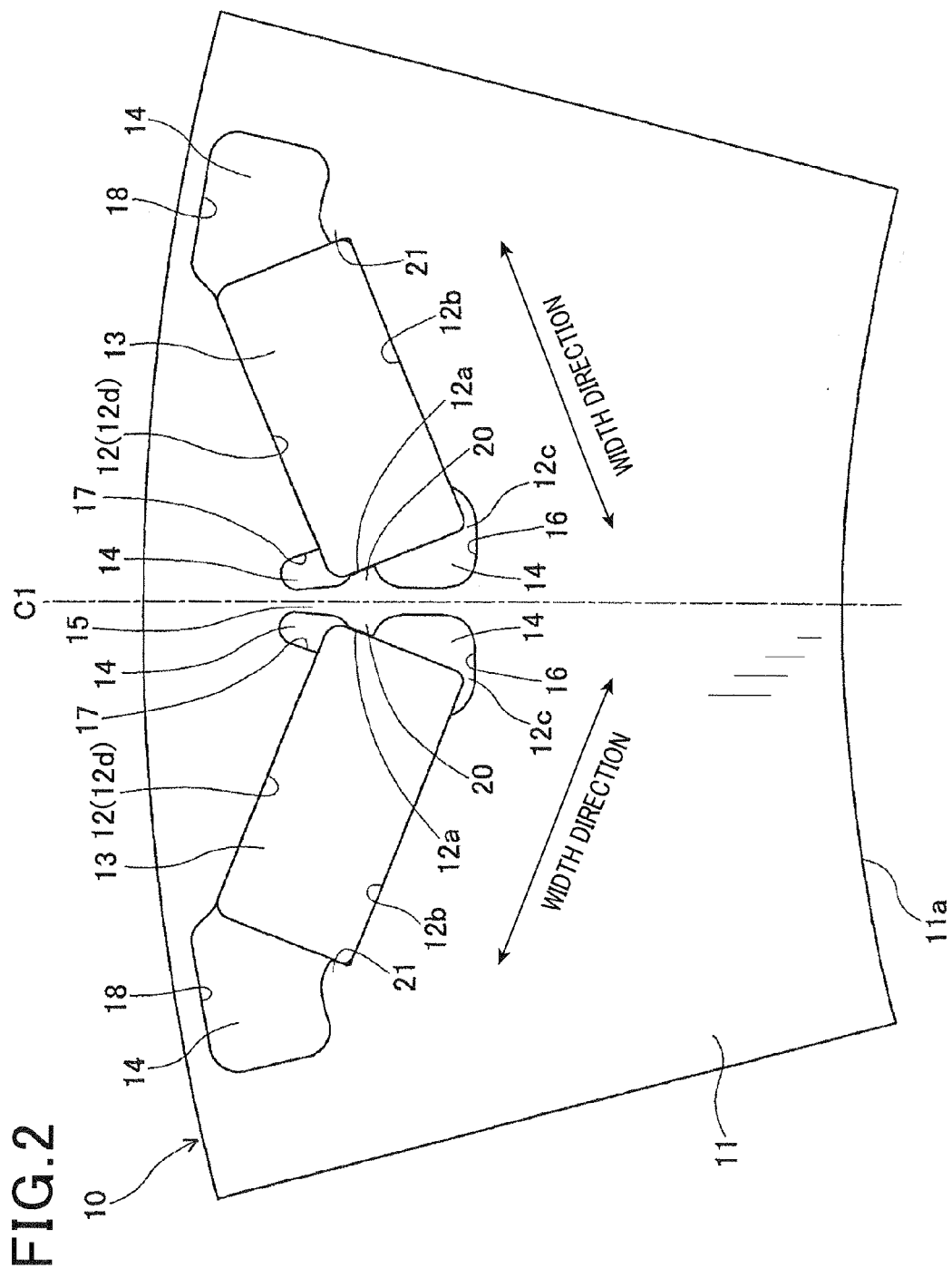
FIG. 2 is an enlarged axial view of the portion of the rotor shown in FIG. 1.

As shown in FIGS. 1 and 2, the rotor 10 includes a rotor core 11, a plurality of permanent magnets 13 embedded in the rotor core 11, and a filler 14 filled in void spaces formed between the rotor core 11 and the permanent magnets 13. That is to say, in the present embodiment, the rotor 10 is configured as an Interior Permanent Magnet (IPM) rotor.

The rotor core 11 is formed, by axially laminating a plurality of annular magnetic steel sheets, into a hollow cylindrical shape. Consequently, at the radial center of the rotor core 11, there is formed a through-hole 11a, in which the rotating shaft is to be fixedly fitted so as to rotate together with the rotor core 11.

The permanent magnets 13 are embedded in the rotor core 11 so as to form a plurality of magnetic poles of the rotor 10 on the radially outer periphery of the rotor core 11. The magnetic poles are equally spaced in the circumferential direction of the rotor core 11 at predetermined intervals so that the polarities of the magnetic poles alternate between north and south in the circumferential direction. In addition, in the present embodiment, the number of the magnetic poles of the rotor 10 is equal to, for example, 12 (i.e., 6 north poles and 6 south poles).

More specifically, in the present embodiment, the rotor core 11 has a plurality (e.g., 12) of pairs of magnet-receiving holes 12 formed in the vicinity of the radially outer periphery of the rotor core 11. Each of the magnet-receiving holes 12 extends in the axial direction of the rotor core 11 so as to penetrate the rotor core 11 in the axial direction. Further, each of the magnet-receiving holes 12 has a cross section perpendicular to the longitudinal axis O of the rotor core 11, the shape of which is a variation of a rectangle.

In addition, it should be noted that though there is shown only one pair of the magnet-receiving holes 12 in FIGS. 1 and 2, the plurality of pairs of the magnet-receiving holes 12 are equally spaced in the circumferential direction of the rotor core 11 at predetermined intervals.

Moreover, in the present embodiment, each pair of the magnet-receiving holes 12 is arranged so as to form a substantially V-shape that opens toward the radially outer periphery of the rotor core 11. Further, for each pair of the magnet-receiving holes 12, there is formed a corresponding center bridge 15 of the rotor core 11 which extends in a radial direction of the rotor core 11 to separate the two magnet-receiving holes 12 of the pair from each other. The corresponding center bridge 15 is provided for causing magnetic flux saturation and thereby impeding formation of a magnetic circuit between the two magnet-receiving holes 12.

Furthermore, for each pair of the magnet-receiving holes 12, the two magnet-receiving holes 12 of the pair are symmetrically formed with respect to the corresponding center bridge 15; the width directions of the two magnet-receiving holes 12 respectively coincide with the extending directions of the two sides of the substantially V-shape formed by the two magnet-receiving holes 12. In addition, both the longitudinal directions of the two magnet-receiving holes 12 are parallel to the longitudinal axis O of the rotor core 11.

Each of the permanent magnets 13 is inserted in a corresponding one of the magnet-receiving holes 12 of the rotor core 11 so as to extend in the axial direction of the rotor core 11. Further, each of the permanent magnets 13 has a substantially rectangular cross section perpendicular to the axial direction of the rotor core 11 (i.e., the direction of the longitudinal axis O of the rotor core 11). That is to say, in the present embodiment, each of the permanent magnets 13 has a substantially cuboid shape.

Moreover, for each pair of the magnet-receiving holes 12 of the rotor core 11, the two permanent magnets 13 which are respectively inserted in the two magnet-receiving holes 12 of the pair are arranged so that the polarities (north or south) of the two permanent magnets 13 are the same on the radially outer periphery of the rotor core 11. Consequently, the two permanent magnets 13 together form one of the magnetic poles of the rotor 10 on the radially outer periphery of the rotor core 11. In addition, as shown in FIG. 1, when viewed along the axial direction of the rotor core 11, the two permanent magnets 13 are symmetrically arranged and extend obliquely with respect to a centerline C1 of the magnetic pole; the centerline C1 extends in the radial direction, along which the corresponding center bridge 15 of the rotor core 11 is formed, and bisects the magnetic pole in the circumferential direction of the rotor core 11. Consequently, the two permanent magnets 13 also together form a substantially V-shape that opens radially outward (i.e., toward the radially outer periphery of the rotor core 11).

Furthermore, in the present embodiment, for each of the magnet-receiving holes 12 of the rotor core 11, there is formed a first protrusion 20 that protrudes from the corresponding center bridge 15 of the rotor core 11 inward of the magnet-receiving hole 12, so as to position the corresponding permanent magnet 13 in the circumferential direction of the rotor core 13 on the corresponding center bridge 15 side. Further, the first protrusion 20 is offset radially outward from a radial center position of the corresponding center bridge 15. In other words, the first protrusion 20 is positioned closer to the radially outer end than the radially inner end of the corresponding center bridge 15. Moreover, at the two corner portions of the magnet-receiving hole 12 respectively on opposite sides of the first protrusion 20, there are respectively formed first and second magnetic flux barriers 16 and 17. Consequently, a first wall surface 12a of the magnet-receiving hole 12, which extends perpendicular to the width direction of the magnet-receiving hole 12 on the centerline C1 side, is formed only at a distal end of the first protrusion 20.

The first magnetic flux barrier 16 is formed at the corner portion 12c (to be referred to as the radially innermost corner portion 12c hereinafter) between the first wall surface 12a and a second wall surface 12b of the magnet-receiving hole 12; the second wall surface 12b extends in the width direction of the magnet-receiving hole 12 on the radially inner side. The first magnetic flux barrier 16 is defined by a curved surface that includes three or more single-curvature surfaces having different curvatures.

Figure 3:
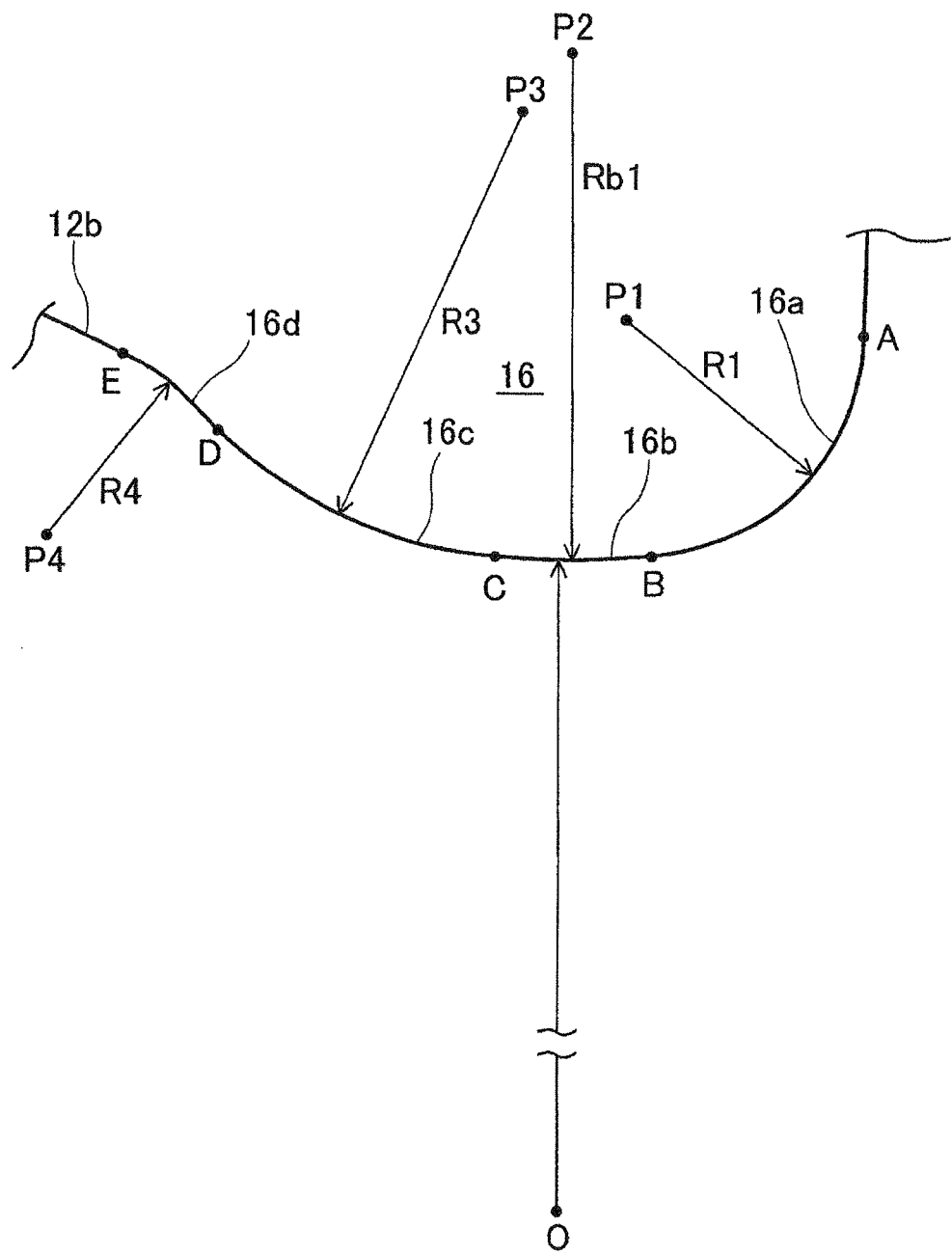
FIG. 3 is a schematic view illustrating the configuration of a first magnetic flux barrier formed in the rotor according to the first embodiment.

More particularly, in the present embodiment, as shown in FIG. 3, the curve surface includes first to fourth continuous single-curvature surfaces 16a-16d. The first single-curvature surface 16a (A-B) has a radius of curvature R1 and its center of curvature P1 located radially outside of the curved surface. The second single-curvature surface 16b (B-C) has a radius of curvature Rb1 and its center of curvature P2 located radially outside of the curved surface. The third single-curvature surface 16c (C-D) has a radius of curvature R3 and its center of curvature P3 located radially outside of the curved surface. The fourth single-curvature surface 16d (D-E) has a radius of curvature R4 and its center of curvature P4 located radially inside of the curved surface.

Among the curvatures of the first to the fourth single-curvature surfaces 16a-16d, the curvature of the second single-curvature surface 16b is the minimum. Moreover, among the first to the fourth single-curvature surfaces 16a-16d, the second single-curvature surface 16b is positioned closest to the longitudinal axis O of the rotor core 11. Therefore, it is easiest for centrifugal stress (i.e., stress induced by centrifugal force) to concentrate on the second single-curvature surface 16b among the first to the fourth single-curvature surfaces 16a-16d. However, the second single-curvature surface 16b is arranged away from the corresponding center bridge 15 on which it is also easy for centrifugal stress to concentrate. Consequently, with the above arrangement, it is possible to distribute stress concentration in the rotor core 11.

Furthermore, the fourth single-curvature surface 16d, which is provided between the third single-curvature surface 16c and the second wall surface 12b of the magnet-receiving hole 12, is convex radially outward while the third single-curvature surface 16c is convex radially inward. That is, the third and fourth single-curvature surfaces 16c and 16d are formed so as to be respectively convex toward opposite directions. Consequently, it is possible to smoothly connect the third single-curvature surface 16c and the second wall surface 12b of the magnet-receiving hole 12 with the fourth single-curvature surface 16d.

In addition, the first single-curvature surface 16a may be connected to the first protrusion 20 via any suitable flat or curved surface.

The second magnetic flux barrier 17 is formed at the corner portion between the first wall surface 12a and a third wall surface 12d of the magnet-receiving hole 12; the third wall surface 12d extends in the width direction of the magnet-receiving hole 12 on the radially outer side. The second magnetic flux barrier 17 is provided for causing a magnetic short circuit along the centerline C1 of the magnetic pole (or along the corresponding center bridge 15). In addition, the second magnetic flux barrier 17 is formed so as to protrude radially outward from the third wall surface 12d of the magnet-receiving hole 12 at a predetermined circumferential width and by a predetermined height.

Moreover, at the end of the second wall surface 12b of the magnet-receiving hole 12 on the opposite side to the corresponding center bridge 15, there is formed a second protrusion 21 for positioning the corresponding permanent magnet 13 in the circumferential direction of the rotor core 11 on the opposite side to the corresponding center bridge 15. Further, on the radially outside of the second protrusion 21, there is formed a third magnetic flux barrier 18.

Furthermore, the filler 14 is filled in all of the gaps between the wall surfaces of the magnet-receiving hole 12 and the corresponding permanent magnet 13 and the first to the third magnetic flux barriers 16-18, thereby fixing the corresponding permanent magnet 13 in the magnet-receiving hole 12. That is, the first to the third magnetic flux barriers 16-18 are filled with the filler 14. In addition, the filler 14 is made of a nonmagnetic material, such as epoxy resin.

After having described the configuration of the rotor 10 according to the present embodiment, advantages thereof will be described hereinafter.

In the present embodiment, the rotor 10 includes the hollow cylindrical rotor core 11 and the permanent magnets 13. The rotor core 11 has the longitudinal axis O and the plurality of pairs of the magnet-receiving holes 12 formed therein. Each pair of the magnet-receiving holes 12 are arranged in the substantially V-shape that opens toward the radially outer periphery of the rotor core 11. Each of the permanent magnets 13 is received in the corresponding one of the magnet-receiving holes 12 of the rotor core 11. For each pair of the magnet-receiving holes 12, the two permanent magnets 13 which are respectively received in the two magnet-receiving holes 12 of the pair are arranged so as to together form one magnetic pole of the rotor 10. The rotor core 11 further has, for each pair of the magnet-receiving holes 12, the corresponding center bridge 15 that extends in the radial direction of the rotor core 11 between the two magnet-receiving holes 12 of the pair to separate them from each other. For each of the magnet-receiving holes 12, there are also formed the first protrusion 20 and the first magnetic flux barrier 16 in the rotor core 11. The first protrusion 20 protrudes from the corresponding center bridge 15 inward of the magnet-receiving hole 12, so as to position the corresponding magnet 13 received in the magnet-receiving hole 12. The first protrusion 20 is positioned closer to the radially outer end of the corresponding center bridge 15 than the radially inner end of the corresponding center bridge 15. The first magnetic flux barrier 16 is positioned at the radially innermost corner portion 12c of the magnet-receiving hole 12 and defined by the curved surface that includes three or more single-curvature surfaces having different curvatures. Among the single-curvature surfaces, the second single-curvature surface 16b which has the minimum curvature is positioned closest to the longitudinal axis O of the rotor core 11.

With the above configuration, the first protrusion 20, which would be provided at the radially innermost corner portion 12c of the magnet-receiving hole 12 according to the prior art, is offset radially outward from the radial center position of the corresponding center bridge 15. Consequently, the influence of the first protrusion 20 on generation of centrifugal stress in the corresponding center bridge 15 is reduced, thereby preventing excessive stress concentration from occurring in the corresponding center bridge 15.

Moreover, with the above configuration, it is easiest for centrifugal stress to concentrate on the second single-curvature surface 16b among the single-curvature surfaces of the curved surface defining the first magnetic flux barrier 16. However, the second single-curvature surface 16b is located away from the corresponding center bridge 15. Consequently, it is possible to distribute stress concentration in the rotor core 11. In other words, it is possible to prevent excessive stress concentration from occurring in the rotor core 11.

Furthermore, with the above configuration, the first protrusion 20, at which a maximum thermal stress may occur, is positioned away from the radially innermost corner portion 12c. Consequently, thermal stress concentration will not occur at the same areas of the rotor core 11 as centrifugal stress concentration. As a result, it is possible to reduce the total stress concentration in the rotor core 11.

Moreover, in the present embodiment, the curved surface which defines the first magnetic flux barrier 16 includes the first single-curvature surface 16a having the radius of curvature R1 and its center of curvature P1 located radially outside of the curved surface, the second single-curvature surface 16b having the radius of curvature Rb1 and its center of curvature P2 located radially outside of the curved surface, and the third single-curvature surface 16c having the radius of curvature R3 and its center of curvature P3 located radially outside of the curved surface.

With the above configuration, it is possible to easily realize the first magnetic flux barrier 16 having the above-described advantageous effects.

In the present embodiment, the curved surface which defines the first magnetic flux barrier 16 further includes the fourth single-curvature surface 16d between the third single-curvature surface 16c and the second wall surface 12b of the magnet-receiving hole 12. The fourth single-curvature surface 16d has the radius of curvature R4 and its center of curvature P4 located radially inside of the curved surface.

With the above configuration, the third and fourth single-curvature surfaces 16c and 16d are respectively convex toward opposite directions. Consequently, it is possible to smoothly connect the third single-curvature surface 16c and the second wall surface 12b of the magnet-receiving hole 12 with the fourth single-curvature surface 16d.

In the present embodiment, for each of the magnet-receiving holes 12 of the rotor core 11, there is also formed, radially outside of the first protrusion 20, the second magnetic flux barrier 17 for causing a magnetic short circuit along the corresponding center bridge 15.

Consequently, with the second magnetic flux barrier 17, the total area in which stress occurs is increased, thereby reducing stress concentration on the corresponding center bridge 15. Moreover, it is possible to enhance magnetic flux saturation at the corresponding center bridge 15, thereby improving the performance of the motor.

Second Embodiment

This embodiment illustrates a rotor 10 which has almost the same configuration as the rotor 10 according to the first embodiment; accordingly, only the differences therebetween will be described hereinafter.

In the first embodiment, for each of the magnet-receiving holes 12 of the rotor core 11, there is formed, at the radially innermost corner portion 12c of the magnet-receiving hole 12, the first magnetic flux barrier 16 which is defined by the curved surface that includes the first to the fourth continuous single-curvature surfaces 16a-16d (see FIG. 3).

Figure 4:
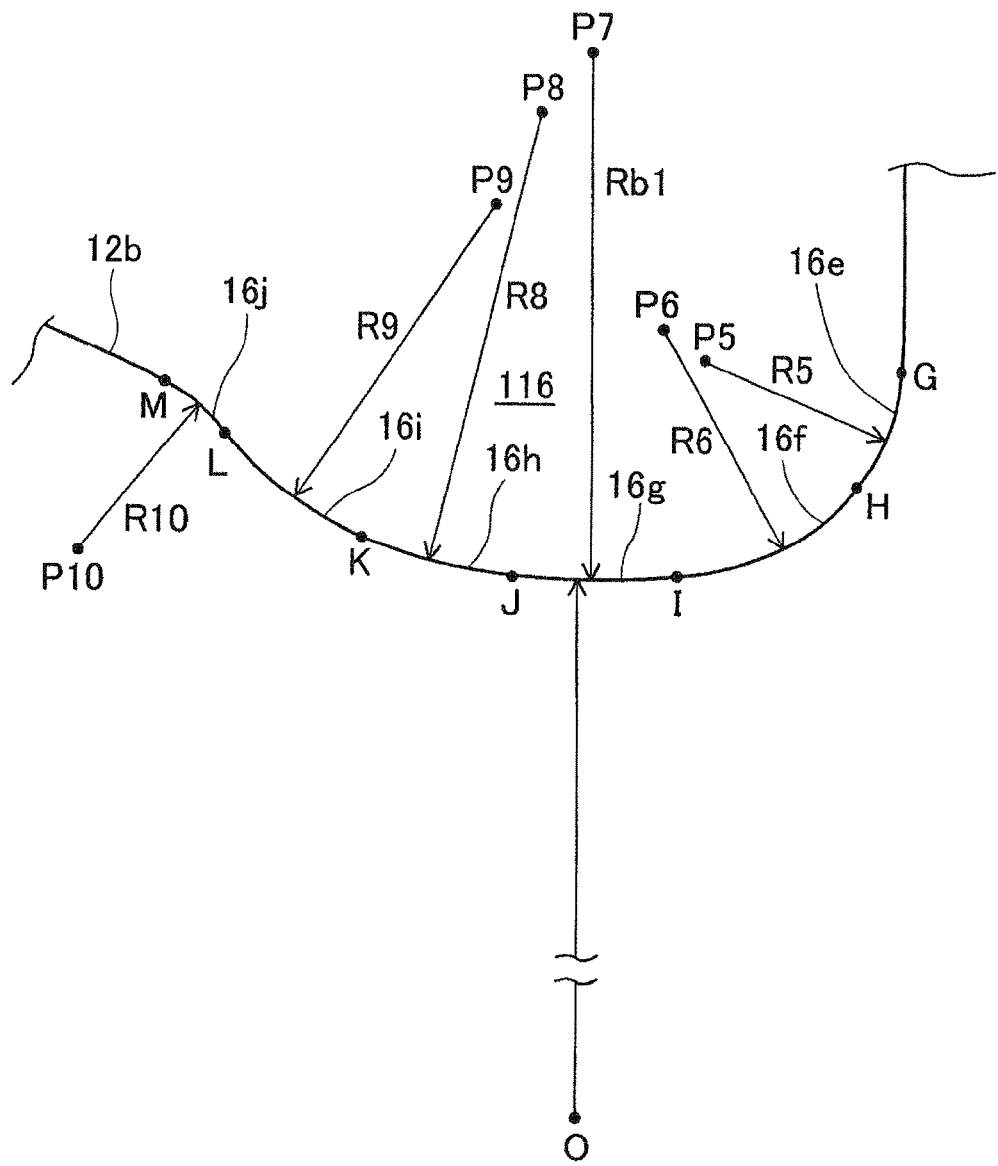
FIG. 4 is a schematic view illustrating the configuration of a first magnetic flux barrier formed in a rotor according to a second embodiment.

In comparison, in the present embodiment, as shown in FIG. 4, for each of the magnet-receiving holes 12 of the rotor core 11, there is formed, at the radially innermost corner portion 12c of the magnet-receiving hole 12, a first magnetic flux barrier 116. The first magnetic flux barrier 116 is defined by a curved surface that includes first to sixth continuous single-curvature surfaces 16e-16j having different curvatures.

The first single-curvature surface 16e (G-H) has a radius of curvature R5 and its center of curvature P5 located radially outside of the curved surface. The second single-curvature surface 16f (H-I) has a radius of curvature R6 and its center of curvature P6 located radially outside of the curved surface. The third single-curvature surface 16g (I-J) has a radius of curvature Rb1 and its center of curvature P7 located radially outside of the curved surface. The fourth single-curvature surface 16h (J-K) has a radius of curvature R8 and its center of curvature P8 located radially outside of the curved surface. The fifth single-curvature surface 16i (K-L) has a radius of curvature R9 and its center of curvature P9 located radially outside of the curved surface. The sixth single-curvature surface 16j (L-M) has a radius of curvature R10 and its center of curvature P10 located radially inside of the curved surface.

Among the curvatures of the first to the sixth single-curvature surfaces 16e-16j, the curvature of the third single-curvature surface 16g is the minimum. Moreover, among the first to the sixth single-curvature surfaces 16e-16j, the third single-curvature surface 16g is positioned closest to the longitudinal axis O of the rotor core 11. Therefore, it is easiest for centrifugal stress to concentrate on the third single-curvature surface 16g among the first to the sixth single-curvature surfaces 16e-16j. However, the third single-curvature surface 16g is arranged away from the corresponding center bridge 15 on which it is also easy for centrifugal stress to concentrate. Consequently, with the above arrangement, it is possible to distribute stress concentration in the rotor core 11.

Furthermore, in the present embodiment, on one side (i.e., the first protrusion 20 side) of the third single-curvature surface 16g, there are provided the first and second single-curvature surfaces 16e and 16f. On the other side (i.e., the second wall surface 12b side) of the third single-curvature surface 16g, there are provided the fourth, fifth and sixth single-curvature surfaces 16h, 16i and 16j.

That is to say, in the present embodiment, the curved surface which defines the first magnetic flux barrier 116 includes, on each of opposite sides of the third single-curvature surface 16g which has the minimum curvature, a plurality of continuous single-curvature surfaces having different curvatures.

With the above configuration, it is possible to more suitably vary the curvatures of the single-curvature surfaces included in the curved surface defining the first magnetic flux barrier 116, thereby more reliably reducing stress concentration on the curved surface.

While the above particular embodiments have been shown and described, it will be understood by those skilled in the art that various modifications, changes, and improvements may be made without departing from the spirit of the invention.

For example, in the previous embodiments, the invention is directed to the rotor 10 for a vehicular motor. However, the invention can also be applied to a rotor for an electric generator or a rotor for a motor generator that can selectively function either as an electric motor or as an electric generator.

In particular, for a rotor which is used in a rotating electric machine with a gear or a large-diameter shaft provided radially inside of the rotor, remarkable local stress concentration may occur at the radially innermost corner portion of each of the magnet-receiving holes of the rotor core. Therefore, when the present invention is applied to such a rotor, it is possible to maximally achieve the advantageous effects of the invention as described in the previous embodiments.

What is claimed is:

1. A rotor for a rotating electric machine, the rotor comprising:
   a rotor core having a longitudinal axis and a plurality of pairs of magnet-receiving holes formed therein, each pair of the magnet-receiving holes being arranged in a substantially V-shape that opens toward a radially outer periphery of the rotor core; and
   a plurality of magnets each of which is received in a corresponding one of the magnet-receiving holes of the rotor core,
   wherein
   for each pair of the magnet-receiving holes of the rotor core, the two corresponding magnets which are respectively received in the two magnet-receiving holes of the pair are arranged so as to together form one magnetic pole of the rotor,
   the rotor core further has, for each pair of the magnet-receiving holes, a corresponding center bridge that extends in a radial direction of the rotor core between the two magnet-receiving holes of the pair to separate them from each other,
   for each of the magnet-receiving holes, there are also formed a first protrusion, a second protrusion and a magnetic flux barrier in the rotor core,
   the first protrusion protrudes from the corresponding center bridge inward of the magnet-receiving hole, so as to position the corresponding magnet received in the magnet-receiving hole,
   the first protrusion is positioned closer to a radially outer end of the corresponding center bridge than a radially inner end of the corresponding center bridge,
   the second protrusion protrudes from a wall surface of the magnet-receiving hole, so as to position the corresponding magnet received in the magnet-receiving hole on the opposite side of the corresponding magnet to the corresponding center bridge,
   the magnetic flux barrier is positioned at a radially innermost corner portion of the magnet-receiving hole and defined by a curved surface that includes three or more single-curvature surfaces having different curvatures, and
   among the single-curvature surfaces, the single-curvature surface which has the minimum curvature is positioned closest to the longitudinal axis of the rotor core,
   wherein
   for each pair of the magnet-receiving holes of the rotor core, an imaginary straight line, which extends through both the first and second protrusions formed in one of the two magnet-receiving holes of the pair, also passes through the first protrusion formed in the other of the two magnet-receiving holes.

2. The rotor as set forth in claim 1, wherein the curved surface which defines the magnetic flux barrier includes first to third continuous single-curvature surfaces, the first single-curvature surface having a first radius of curvature and its center of curvature located radially outside of the curved surface, the second single-curvature surface having a second radius of curvature and its center of curvature located radially outside of the curved surface, the third single-curvature surface having a third radius of curvature and its center of curvature located radially outside of the curved surface, and
   among all the single-curvature surfaces included in the curved surface, the second single-curvature surface has the minimum curvature and is positioned closest to the longitudinal axis of the rotor core.

3. The rotor as set forth in claim 2, wherein the curved surface which defines the magnetic flux barrier further includes a fourth single-curvature surface that connects the third single-curvature surface and a radially inner-side wall surface of the magnet-receiving hole, the fourth single-curvature surface having a fourth radius of curvature and its center of curvature located radially inside of the curved surface.

4. The rotor as set forth in claim 1, wherein the curved surface which defines the magnetic flux barrier includes, on each of opposite sides of the single-curvature surface which has the minimum curvature, a plurality of continuous single-curvature surfaces having different curvatures.

5. The rotor as set forth in claim 1, wherein for each of the magnet-receiving holes of the rotor core, there is also formed, radially outside of the first protrusion, a second magnetic flux barrier for causing a magnetic short circuit along the corresponding center bridge.

* * * * *